Oct. 28, 1952     T. D. NATHAN     2,615,740
SEALING RING

Filed Sept. 3, 1948     2 SHEETS—SHEET 2

INVENTOR.
Tracy D. Nathan
BY Willard D. Eakin
Attorney

Patented Oct. 28, 1952

2,615,740

UNITED STATES PATENT OFFICE 2,615,740

SEALING RING

Tracy D. Nathan, Cuyahoga Falls, Ohio, assignor to Hamilton Kent Manufacturing Company, a corporation of Ohio Application September 3, 1948, Serial No. 47,727

2 Claims. (Cl. 288—19)

This invention relates to sealing rings for joints between lengths of pipe shaped for assembling in plug-and-socket relationship, and to pipe-coupling assemblies employing such rings.

Its chief objects are to provide a sealing ring adapted to provide a strong and lasting seal although permitting substantial tolerance in the size and shape of the male and female members between which it is mounted; to provide a cushioned stop for the plugging in movement of the male member; to provide against breakage of the pipe by contact of the rigid pipe members with one another; to provide substantial flexibility in a jointed line of rigid pipe; to provide effectively against flow of liquid into the line of pipe, through the joint, when the external fluid pressure is greater than the internal fluid pressure, as in the case of a sewer laid at a depth greater than that of the underground "water table"; to provide facility of inspection; and to provide facility and economy of manufacture and assembly.

Figure 4:
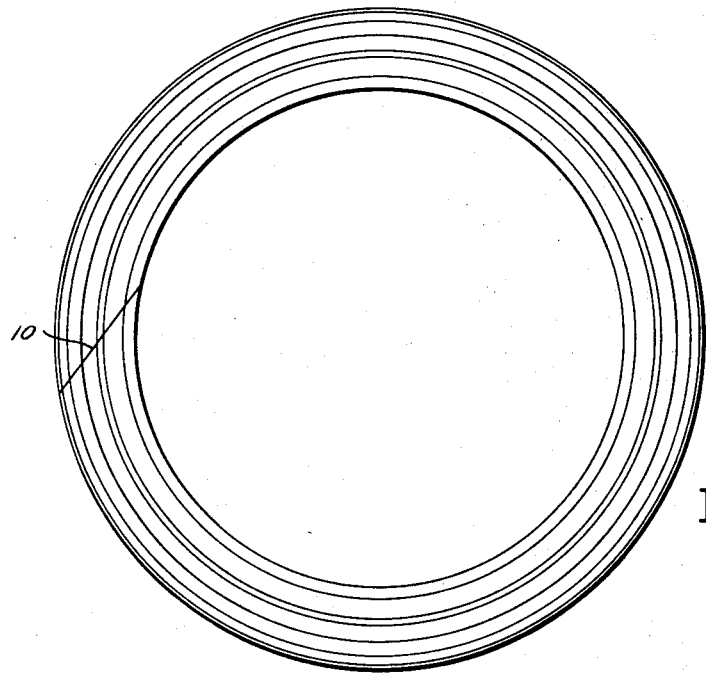
Fig. 4 is an elevation of one of the rings illustrating the preferred manner in which they are made endless.

Preferably, for economy of manufacture, the rings are made by extruding in suitable cross-sectional shape a continuous strip of natural or synthetic rubber composition, cutting the strip into suitable lengths by oblique cuts, and joining the ends of each length in an oblique splice, shown at 10 in Fig. 4.

The stock can be partially or completely vulcanized while it is in the continuous strip form but the splice preferably is further vulcanized for strength, with or without the use of an adhesive.

Figure 1:
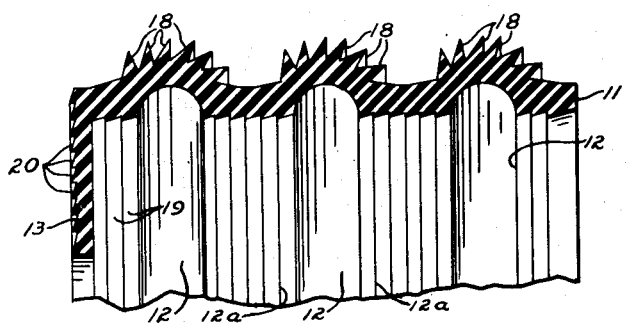
Fig. 1 is a fragmentary view of a ring embodying my invention in its preferred form for providing large tolerance in the size and shape of the mating rigid pipe members, showing a cross-section of the ring.

The ring shown in Fig. 1 comprises a generally or roughly cylindrical body portion 11 internally formed with several spaced apart annular grooves 12, 12 of half-circle form in cross-section, and projecting radially inward from one end of the body portion 11 is an annular flange 13.

Externally the body portion 11 is of ridged form at the positions of the internal grooves 12 so that in effect the body portion consists of a series of arches which are spaced apart axially of the ring and are connected at their bases by approximately cylindrical annular zones of stock 12a, 12a.

Figure 5:
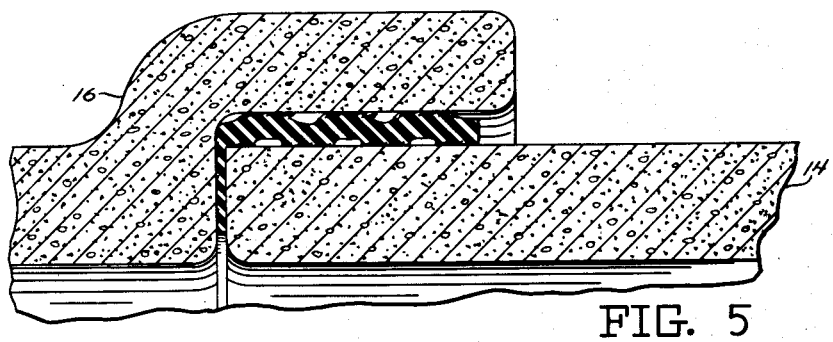
Fig. 5 is a fragmentary sectional view of pipe ends having respectively male and female cylindrical sealing surfaces, with one of my sealing rings in place.
Figure 6:
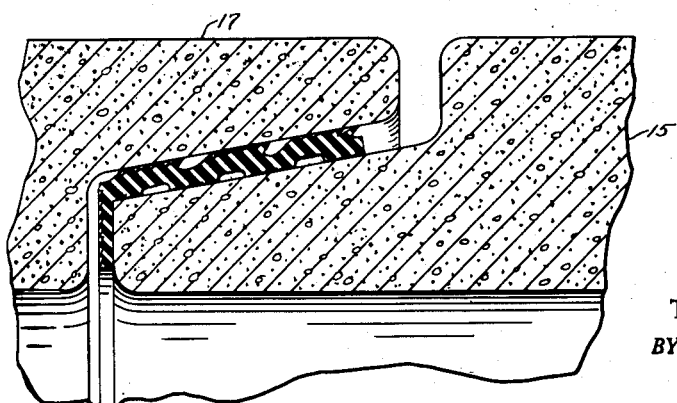
Fig. 6 is a similar view in which the pipe ends have conical male and female sealing faces.

In making the joint the ring is first stretched onto the "spigot," 14 in Fig. 5 or 15 in Fig. 6, and preferably both the body portion 11 and the flange portion 13 are cemented to the spigot, and then the spigot, with the ring on it, is plugged into the bell, 16 in Fig. 5 or 17 in Fig. 6.

The adhesive, suitably chosen according to the composition of the members that are to be adhered to each other, serves as a lubricant for the mounting of the ring on the spigot and then bonds them to each other when it dries.

Cementing of the ring to the spigot assures against leakage between the two and provides convenient sub-assemblies requiring only to be plugged into one another in series for the laying of the line of pipe.

For high sealing pressure per unit of contact area the outer faces of the arches preferably are formed with triangular annular ribs 18, 18, and these ribs preferably are inclined in a direction to cause them to become more inclined as they pass into the bell 16 or 17, for easy entry. This inclination also adapts them to have lip-sealing relationship to the sealing face of the bell against flow of fluid from the exterior to the interior of the pipe line.

Similarly the inner faces of the ring which contact the spigot preferably are formed with annular serrations 19, 19 inclined in a direction such that they become more inclined in the sliding of the ring onto the spigot, these serrations providing high pressure of contact per unit of area, and providing pockets for the cement with which the ring is secured to the spigot.

Likewise the flange 13 preferably is formed with annular serrations 20, 20 on its face nearest to, and permissibly contacting, the radial shoulder at the base of the bell, and these serrations preferably are inclined, as shown, in a radially inward direction, so as to have lip-sealing relation to the shoulder against outward flow of fluid from the pipe line.

The ring preferably is of such size that its body portion will be stretched about 15% in mounting it upon a cylindrical spigot such as that shown in Fig. 5, or that its least-stretched end portion will be stretched about 15% in mounting it upon a conical spigot as shown in Fig. 6.

The radial dimensions of the body portion of the ring are such in relation to the dimensions of the bell and spigot that it will be adequately deformed radially to provide ample sealing pressure for sealing against the fluid pressure to which it is to be subjected, and can be so proportioned that the flange 13 can be compressed between the end face of the spigot and the shoulder of the bell, as shown in Fig. 5 as to the cylindrical type of bell and spigot.

In the case of the conical type of bell and spigot, shown in Fig. 6, the body portion of the ring can provide the cushioned stop for the plugging-in movement.

In either case inspection of the job is facilitated because the presence and proper positioning of the sealing ring can be readily ascertained by checking the flange 13, visually or by means of a feeler.

The grooves 12 and the spaces between the ribs or serrations 18 provide for wide range deformation of the ring in spite of the fact that the resilient material of which it is made is substantially incompressible in volume, and thus the ring compensates for substantial inaccuracies of size and shape of the bell and spigot, while having sufficiently low modulus of elasticity to provide ease of assembly even when a pronounced thinning of the body of the ring is required for such compensation.

Figure 2:
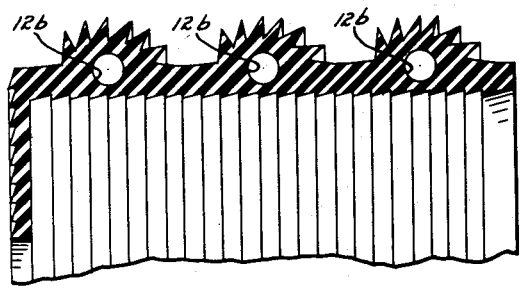
Fig. 2 is a similar view of a modification.

The ring shown in Fig. 2 corresponds substantially to the ring shown in Fig. 1 except that it is formed with cross-sectionally circular internal cavities 12b, 12b, instead of the grooves 12, 12, to provide for the low modulus thinning of the body of the ring.

Figure 3:
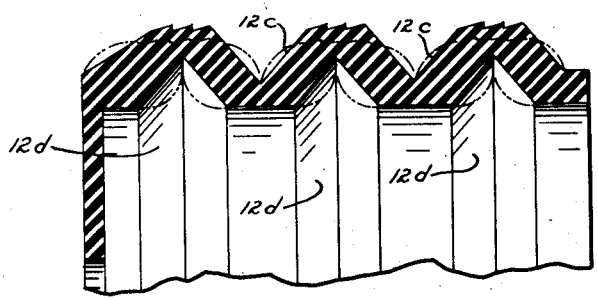
Fig. 3 is a similar view of a ring adapted to provide a strong sealing pressure although permitting substantial tolerance in size and shape of the rigid members.

The ring shown in Fig. 3 differs from those of Figs. 1 and 2 in that the spaces 12c, 12c between the external ribs, and the internal grooves, 12d, 12d, are cross-sectionally triangular, which provides a high range of radial compressibility of the body portion of the ring, but with a high modulus, for strong sealing pressure, by reason of the fact that the legs of each V-shaped zone of rubber yield not by merely flexing but largely by bulging of opposite faces of each inclined leg, as represented by the dotted lines in Fig. 3, with the internal bulges coming progressively into contact with each other and thus providing an increasing resistance to further deformation of the ring.

Further modifications are possible within the scope of the appended claims.

In each of the three embodiments of the invention which are illustrated in Figs. 1, 2 and 3 each of the hollow annular elements is of stable arch form in that, being of only moderate height and of arcuate or triangular configuration, it is not highly subject to collapse by forces applied sidewise or obliquely sidewise to the arch, as distinguished from a hollow element of rectangular cross-sectional configuration, which would be highly subject to careening or collapsing in response to forces applied sidewise or obliquely sidewise to it, because, as against such forces, it would resist collapse only by resistance to flexure of its walls, and not in the manner of a true arch.

The stability of these hollow annular elements or arches under the conditions of use is contributed to also by the fact that each of the spigot-gripping footing faces of the ring, that are in alternation with the arches, is of such axial length or span, greater than the wall thickness of each of the legs of the adjacent arch portions, that they effectively buttress the legs of the arch elements.

I claim:

1. A sealing ring for bell-and-spigot pipe, said ring having a tubular radial-compression wall portion which comprises a series of spigot-gripping annular base elements having respective internal annular footing surfaces for gripping the spigot, the said base elements being connected in series by axially intervening hollow annular portions each of stable arch form, the spigot-gripping internal footing face of each base element being, when the ring is in an unstrained condition, of axial span greater than the wall thickness of each of the adjacent legs of the adjacent arch portions, each of said base elements thus constituting a buttress for said legs of the said arch portions so that the said footing faces are not substantially extended axially by radial compression of the ring against the spigot, and each of said arch portions being of such stability as an arch, by reason of wall thickness and shape of the arch, as to maintain the arches in substantially the same symmetrical arch form in their being radially compressed by axial movement of the ring, with the spigot therein, into the bell.

2. A ring as defined in claim 1 in which each arch portion has a plurality of annular sealing ribs on its outer surface.

TRACY D. NATHAN.

REFERENCES CITED

The following references are of record in the file of this patent:

UNITED STATES PATENTS

| Number | Name | Date |
|---|---|---|
| 1,817,774 | Sipe | Aug. 4, 1931 |
| 2,188,815 | Murphy | Jan. 30, 1940 |
| 2,274,324 | Fisher | Feb. 24, 1942 |
| 2,280,183 | Bennett | Apr. 21, 1942 |
| 2,314,386 | Brend | Mar. 23, 1943 |
| 2,356,947 | Pranger et al. | Aug. 27, 1944 |
| 2,423,122 | Stephens | July 1, 1947 |
| 2,448,769 | Chamberlain | Sept. 9, 1948 |
| 2,501,943 | Jack | Mar. 28, 1950 |